UNITED STATES PATENT OFFICE.

FRANK E. BACHMAN, OF PORT HENRY, NEW YORK.

METHOD OF TREATING TITANIUM SOLUTIONS.

1,354,940.  Specification of Letters Patent.  Patented Oct. 5, 1920.

No Drawing.   Application filed June 3, 1918. Serial No. 237,899.

*To all whom it may concern:*

Be it known that I, FRANK E. BACHMAN, a resident of Port Henry, in the county of Essex and State of New York, have invented a new and useful Improvement in the Methods of Treating Titanium Solutions, of which the following is a full, clear, and exact description.

My invention relates to treating titanium solutions, particularly those used in the manufacture or recovery of titanium oxid.

Heretofore in the manufacture of titanium oxid, the titanium is brought into solution in sulfuric or hydrochloric acid, usually the former, together with part or all of the iron contained in the raw material. In this method, the contained iron was reduced to a ferrous state by well known reducing agents, generally $H_2S$ or $SO_2$, the solution then being diluted and boiled. By this method, the titanium was precipitated as a hydroxid carrying as impurities part of the iron present; and when a sulfuric acid solution was used, a part of the sulfuric acid, probably in the form of basic sulphates of iron and titanium. When a hydrochloric acid solution is used, the precipitate likewise contains iron, but is free from titanium sulphate.

As these titanium hydroxid precipitates contain iron and other impurities, they are always more or less colored thereby, and hence reduced in value.

My invention is designed to overcome this difficulty, and to remove all or a large part of the iron and other impurities from the solution before precipitation of the titanium hydroxid. I thereby not only obtain a purer and more valuable titanium hydroxid, but also in my preferred method obtain iron in the form of valuable products, namely, blue pigments, these being cyanid compounds of iron known as "Prussian" blue and "Turnbull's" blue. After removing the iron, I can oxidize or decompose and remove carbonaceous matter often present in solution, thereby further purifying the titanium hydroxid after it is precipitated, and after precipitation can also recover the sulfuric or hydrochloric acid, in which the titanium was dissolved.

In describing the preferred forms of my invention, I will refer only to sulfuric acid solutions of the titanium oxid, as this is almost universally used as a solvent.

The solutions to be treated are those of titanium sulphate $Ti(SO_4)_2$ containing either ferric sulfate, ferrous sulfate or both ferric and ferrous sulfate or solutions containing both titanic and titanous sulfate $Ti(SO_4)_2$ and $Ti_2(SO_4)_3$ together with ferrous sulfate. I prefer to remove iron from such solutions by precipitating it with soluble ferro or ferri cyanid salts. There are many of these salts known to those skilled in the art, such as sodium, ammonium, calcium and potassium ferro and ferri cyanids. I prefer to employ the potassium ferro and ferri cyanids, as they are more easily obtainable than the others.

When potassium ferro cyanid $K_4Fe(CN)_6$ solution is mixed with a solution of ferric sulfate $Fe_2(SO_4)_3$ there is produced a ferric ferro cyanid $Fe_4Fe_3(CN)_{18}$ precipitate, and when mixed with ferrous sulfate $FeSO_4$ solution, there is produced potassio-ferrous ferro-cyanid $K_2Fe_2(CN)_6$, both of which are insoluble in titanic sulfate or dilute acids.

When potassium ferro cyanid is mixed with a solution of titanic sulfate free from iron, there is produced a brown precipitate of a composition at present unknown to me. I find, however, that this precipitate is not produced when there is present ferric or ferrous sulfate in sufficient quantity to satisfy the potassium ferro cyanid.

When potassium ferri cyanid $K_3Fe(CN)_6$ solution is mixed with a ferric sulfate solution no precipitate is produced. When mixed with a ferrous sulfate, there is produced a ferrous-ferri cyanid precipitate $Fe_3Fe_2(CN)_{12}$ insoluble in titanic or titanous sulfate and dilute acid solutions.

When $K_3Fe(CN)_6$ solution is mixed with titanic sulfate solution, no precipitate is formed. When mixed with a titanous sulfate solution, there is formed a brown precipitate of a composition at present unknown to me. Ferro and ferri cyanid salts produce insoluble precipitates with lead, zinc, manganese and nickel, elements which may be present in titanium solutions. Should any or all of these elements be in the solutions purified by the process herein described, they will be removed.

If the solution I am purifying contains ferric sulfate, ferrous sulfate, or both ferric and ferrous sulfates, and I desire to use potassium ferro cyanid for a precipitant, I prefer to first oxidize the titanous sulfate and the ferrous sulfate to titanic sulfate and ferric sulfate. The reason for this is that the end point of the precipitation is more readily determined, and furthermore, the $Fe_4Fe_3(CN)_{18}$ precipitate requires less manipulation to convert it into a commercial form than does the $K_2Fe_2(CN)_6$ or the mixture of the two.

The oxidation is performed by any of the well known oxidizing agents, nitric acid for example. I then dilute the titanium solution until it contains 5% or less $TiO_2$. I also prepare a solution of potassium ferro cyanid of approximately 1 part to 30 of water. These solutions I prefer to warm to 40° to 60° C., having first made sure that the titanium solution contains sufficient free acid to prevent the precipitation of titanium hydroxid at 60° C. The titanium solution is well agitated, the ferro cyanid solution being slowly added in sufficient quantity to theoretically precipitate all of the iron present, as figured from an analysis of the titanium solution. I then withdraw a small portion of the solution, free it from the precipitate, and test for ferric iron, using preferably a sulfo cyanid solution as an indicator. I continue the addition of the ferro cyanid solution until no ferric iron is present, taking care not to add too great an excess of the precipitant. If by mistake, too much has been added, I remove it by the addition of the necessary quantity of ferric sulfate solution. An excess of the precipitant above the theoretical amount is always required, owing to the formation of a small amount of the brown titanium precipitate; the excess required depending largely on the amount of $TiO_2$ present in the solution. I then filter, wash and dry the precipitate which is variously known as "Berlin," "Paris" or "Prussian" blue, a pigment of great value.

In carrying out my invention in its preferred form when potassium ferri cyanid is used as a precipitant, I first convert all the ferric sulfate present in the solution into ferrous sulfate. This may be done by using any of the well known reducing agents. I prefer, however, as more economical, to reduce it by electrolysis, carrying the electrolytic reduction to a point where traces of ferric iron still remain and finishing the reduction by adding a solution of titanium sulfate in slight excess of the amount necessary to reduce the remaining ferric sulfate. My object is to have present a reducing agent in sufficient quantity to prevent the re-oxidation of any of the ferrous sulfate to ferric sulfate during the subsequent manipulation.

If an excess of titanous sulfate is present in the solution, I prefer to oxidize the greater part, but not all of it. This I accomplish by addition of nitric acid, ferric sulfate, chlorin or other oxidizing agents, or by passing air through the solution. My object in oxidizing the titanous sulfate is to prevent its precipitation as the brown precipitate before mentioned, whereby its titanic oxid contents would be lost and the blue precipitate of ferrous ferri cyanid adulterated and reduced in value. No especial precautions are necessary in the precipitation. I prefer to have the titanium and ferri cyanid solutions of such dilution that when the precipitation is complete the mass will not be mushy.

Having determined the amount of iron in my titanium solution, I prepare a potassium ferri cyanid solution containing the necessary amount of the precipitant to theoretically precipitate all of the iron present as $Fe_2Fe_3(CN)_{12}$. I then preferably warm both solution to 40° to 60° C., and unite and thoroughly mix them. If an appreciable amount of iron is present, I obtain a voluminous blue precipitate. I then withdraw a small portion of the solution, filter it, and add a drop of the filtrate to a drop of a dilute potassium ferri cyanid solution which will then turn blue or green, if the precipitation is not complete, after which I add in small quantities ferri cyanid solution and thoroughly mix, withdrawing a portion and testing a drop by mixing with ferri cyanid until no change in color takes place after several minutes. I then test the solution withdrawn by adding to it a portion of ferrous salt. If it turns blue or green, an excess of precipitant has been added. If so, I remove it by adding to the solution enough ferrous salt solution to remove this excess. By this means, I obtain a titanium sulfate solution free from iron. If my titanium solution should have contained certain other elements, such as lead, zinc, manganese or nickel, I shall have removed them with the iron.

In several processes now in use for manufacture of titanic oxid, carbon and carbonaceous material is used in the preliminary operation. There are therefore often present in the titanium oxid solutions to be purified, carbonaceous matter in larger or smaller quantities. Should it be desired to make titanium hydroxid or to convert titanium hydroxid into titanic dioxid without access of air or oxidizing matter in sufficient quantity to oxidize the carbon, it is necessary to remove all carbon present previous to the precipitation of the titanium. In methods where iron is present in the solution from which the titanium is precipitated, this can not be done owing to the fact that the iron will also be oxidized and thereby cause a greater proportion of it to be carried down with the titanium precipitate. Having no iron in the solution, I proceed to treat it with a strong oxidizing agent, such for example, as chlorin, although others may be used. If chlorin is used, I add it in any convenient form, as for example, in gaseous form.

Having now freed my solution from iron and carbonaceous matter, I dilute it to any desired extent and boil. The titanic hydroxid is thereby formed in accord with the well known reaction

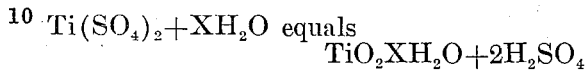

the titanium hydroxid precipitating, the $H_2SO_4$ remaining in solution. It has been long known that when titanium hydroxid is precipitated from a sulfuric acid solution, the decomposition of the titanic sulfate is not complete, some of the sulphate being carried into the precipitate. I therefore in practice get a titanium hydroxid contaminated with titanium sulfate, free from carbon and iron, or containing only minute traces of these elements. The titanium precipitate is then removed from the solution, used as such, or converted into titanic dioxid by the well known means of heating, whereby it is freed from its combined water and sulfuric acid.

The remaining solution which is free from iron and contains only a small amount of solid matter is suitable for recovery for use in preparing subsequent titanium solutions, or for other uses. This I therefore proceed to concentrate by evaporation to any degree of concentration required.

The advantages of my invention will be obvious to those skilled in the art, since not only is a more valuable and purer form of titanium hydroxid obtained, but in the preferred form of my invention, a valuable by-product from the iron impurities is obtained.

Many changes may be made in the reagents employed, the steps carried out, the details of precipitation, etc., without departing from my invention, since I consider myself to be the first to devise a process for separating iron and other elements from the titanium after they have been brought into solution with the titanium.

I claim:

1. In the recovery of titanium hydroxid from solutions, the steps consisting of precipitating the iron as a double cyanid from the solution, and thereafter precipitating the titanium oxid.

2. In the recovery of titanium hydroxid from solutions, the steps consisting of removing iron from the solution, then removing carbonaceous matter from the solution, and thereafter precipitating the titanium oxid from the solution.

3. In the recovery of titanium hydroxid from solutions, the steps consisting of bringing the titanium with its impurities into a dilute acid solution, adding a double cyanid which precipitates metallic impurities, removing the precipitated impurities and thereafter precipitating the titanium oxid.

4. In the recovery of titanium hydroxid from solutions, the steps consisting of removing the iron by adding a cyanid which combines with the iron in solution to form a precipitate, and thereafter precipitating the titanium oxid.

5. In the recovery of titanium hydroxid from solutions, the steps consisting of removing iron from the solution, then oxidizing and removing carbonaceous matter, and thereafter precipitating the titanium.

6. In the recovery of titanium hydroxids from solutions, the steps consisting in adding to the solution a soluble double iron cyanid salt which combines with the iron in solution to form a precipitate, removing the precipitate, and thereafter precipitating the titanium.

7. In the purification of titaniferous solutions containing iron as an impurity, the step which consists in precipitating the iron as a double cyanid.

8. In the purification of titaniferous solutions containing iron as an impurity, the step which consists in adding to the solution a cyanid which combines with the iron to form a precipitate.

9. In the purification of titaniferous solutions, containing metallic impurities, the step which consists in precipitating such metallic impurities as double cyanids.

10. In the purification of titaniferous solutions containing metallic impurities, the step which consists in adding to the solution a cyanid which combines with the metallic impurities to form a precipitate.

In testimony whereof, I have hereunto set my hand.

FRANK E. BACHMAN.